United States Patent [19]
Elder

[11] 3,729,682
[45] Apr. 24, 1973

[54] AUDIO SIGNAL QUALITY INDICATING CIRCUIT

[75] Inventor: James H. Elder, Brookneal, Va.

[73] Assignee: General Electric Company, Lynchburg, Va.

[22] Filed: Aug. 2, 1971

[21] Appl. No.: 168,167

[52] U.S. Cl. ....................325/304, 325/56, 325/305
[51] Int. Cl. ....................H04b 1/16, H04b 7/08
[58] Field of Search ....................325/304, 305, 56

[56] References Cited

UNITED STATES PATENTS

| | | | |
|---|---|---|---|
| 3,296,532 | 1/1967 | Robinson | 325/305 |
| 3,235,807 | 2/1966 | Appel | 325/304 |
| 3,495,175 | 2/1970 | Munch | 325/56 |
| 3,365,666 | 1/1968 | Reynders | 325/304 |

Primary Examiner—Howard W. Britton
Attorney—James J. Williams et al.

[57] ABSTRACT

In a system for selecting one of a plurality of radio receivers, a circuit is provided for each receiver to indicate the quality of the audio signal provided by each receiver. The circuit uses a logarithmic amplifier that has a gain which varies inversely with the received audio signal amplitude. The logarithmically amplified audio signal is applied to an envelope detector which provides an envelope signal of one polarity of the instantaneous audio signal amplitudes. The envelope signal is applied to a valley detector which provides a direct current voltage proportional to the lowest voltage value of the envelope signal, and hence indicative of the noise level between audible sounds. The outputs of all valley detectors in the system are compared, and the receiver providing the lowest valley detector voltage (an indication of the highest quality audio signal) is selected to provide the audio signal utilized at some common location.

4 Claims, 7 Drawing Figures

AUDIO SIGNAL QUALITY INDICATING CIRCUIT

BACKGROUND OF THE INVENTION

My invention relates to an audio signal quality indicating circuit, and particularly to such a circuit for indicating the quality of the audio signal provided by a frequency modulation (FM) radio receiver so that a comparison of the indicated qualities of a plurality of such receivers can be made, and the best audio signal selected for utilization.

In many radio communication systems, an FM receiver is installed at each of several locations so that signals from a mobile FM radio transmitter can be reliably received at all locations of the transmitter. The receiver outputs are connected by a communication link to a common location. There will, of course, be many locations of the radio transmitter where two or more of the receivers receive signals from the transmitter and provide a usable audio signal output. Under such conditions, only the best audio signals should be utilized so as to avoid interference or distortion.

Accordingly, an object of my invention is to provide a new and improved audio signal quality indicating circuit, particularly for use in a receiver selecting arrangement.

Another object of my invention is to provide a new audio signal quality indicating circuit that is relatively simple in construction and relatively reliable in operation.

Various audio signal quality indicating circuits have been previously provided. Some of these previous circuits provide reasonably satisfactory operation. But many also have disadvantages, such as requiring the use of direct current carrying lines between each receiver and the common location; or requiring the use of relays which, after operating, do not permit another receiver to be selected until a given transmission has terminated; or requiring the use of tones which necessitated filtering or other special circuits; or being slow in pickup and dropout operation; or having relatively poor discrimination between good and bad audio signals.

Accordingly, another object of my invention is to provide an audio signal quality indicating circuit that overcomes many of the disadvantages of prior-art audio signal quality indicating circuits, such as those disadvantages enumerated above.

SUMMARY OF THE INVENTION

Briefly, these and other objects are achieved in accordance with my invention by an audio signal quality indicating circuit that utilizes, in the order of audio signal direction, a logarithmic amplifier, an envelope detector, and a valley detector. The logarithmic amplifier provides a logarithmic gain which increases with a decrease in input signal level, and which decreases with an increased signal input level. The logarithmically amplified audio signals are applied to an envelope detector which provides a varying unidirectional signal (preferably positive) that follows the peak amplitudes of the amplified audio signals. The output from the envelope detector is applied to a valley detector which provides a direct current voltage proportional to the lowest voltage value of the envelope signal, this lowest voltage value being an indication of the noise level between audio sounds, usually spoken syllables. The voltages of all valley detector outputs in the system are compared, and means can be provided to select that receiver having the lowest valley detector voltage value. If, during a transmission, another receiver provides a valley detector output voltage that is lower than the voltage for the selected receiver, the better receiver can be quickly selected. Thus, my invention provides an audio signal quality indicating circuit that is relatively simple and reliable and that overcomes many of the disadvantages of prior art audio signal quality indicating circuits.

BRIEF DESCRIPTION OF THE DRAWINGS

The subject matter which I regard as my invention is particularly pointed out and distinctly claimed in the claims. The structure and operation of my invention, together with further objects and advantages, may be better understood from the following description given in connection with the accompanying drawings, in which:

DESCRIPTION OF THE PREFERRED EMBODIMENT

In the following description, I will first give background information on a selecting system and a general description of my audio signal quality indicating circuit in connection with FIGS. 1, 2, 3, and 4. Then, I will give a detailed explanation of my audio signal quality indicating circuit as shown in the schematic diagram of FIGS. *5a*, *5b*, and *5c*.

BACKGROUND INFORMATION AND GENERAL DESCRIPTION

Figure 1:
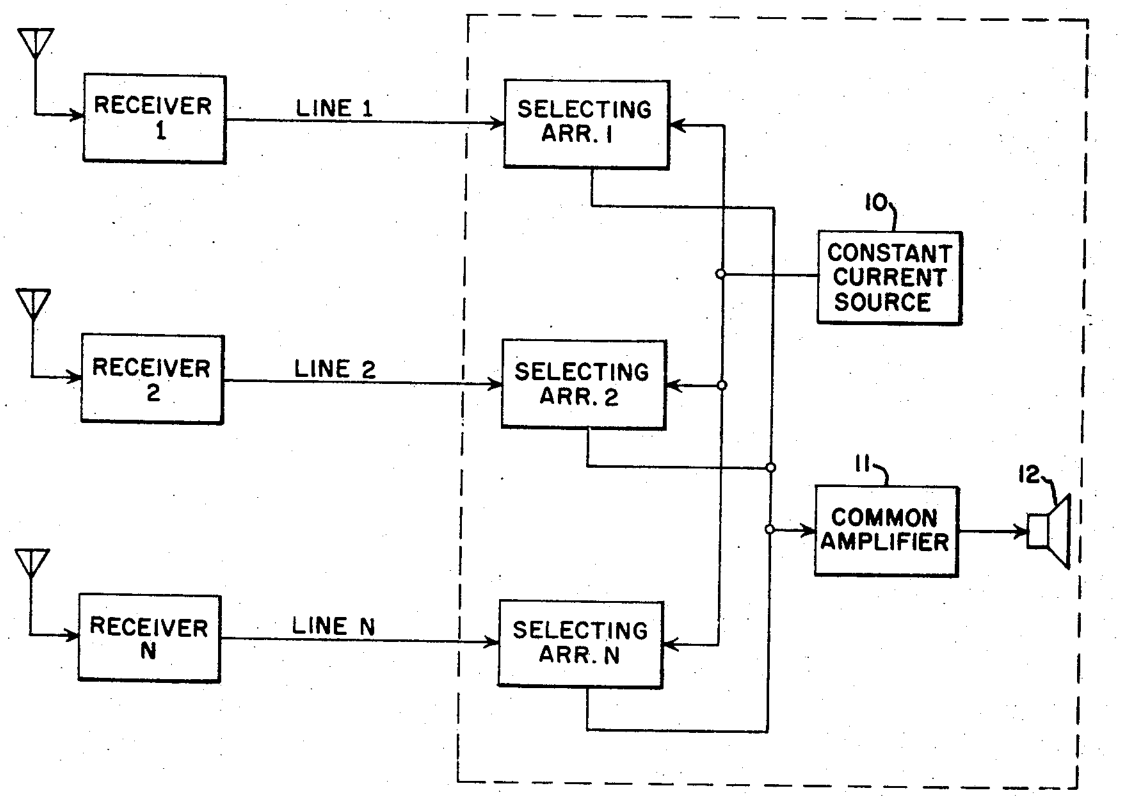
FIG. 1 shows a block diagram of a communication system having a plurality of receivers which are connected to a common location for selection.

In FIG. 1, I show a communication system utilizing three radio receivers, with the last receiver indicated by the letter N to indicate that any number of receivers may be used and a selection made from that number. In a typical system, frequency modulation (FM) is used. The system receivers are positioned at selected, spaced locations, so that for a given radio transmitter (which may have a variable location in an automobile, or carried by a person), preferably two or more of the receivers will receive a signal from that radio transmitter. Each of the receivers is connected over a communication link, which typically is a telephone line, to a common location. The common location is indicated by the dashed line rectangle in FIG. 1. Each receiver is provided with an audio signal quality indicating circuit which, in accordance with my invention, produces a signal indicative of the quality of the signal received from its respective receiver over its respective line.

These indicative signals are compared through use of constant current, and the signal indicative of the best quality is passed by the respective selecting arrangement to a utilization device, which typically is an amplifier 11 and a loudspeaker 12. The signal provided by the loudspeaker 12 thus is the best signal received at any given time, and if conditions change so that a particular receiver provides a better signal, then the selecting arrangement selects that signal. FIG. 1 is provided simply to show a typical application for my invention and to provide some background for an understanding of my invention.

Figure 2:
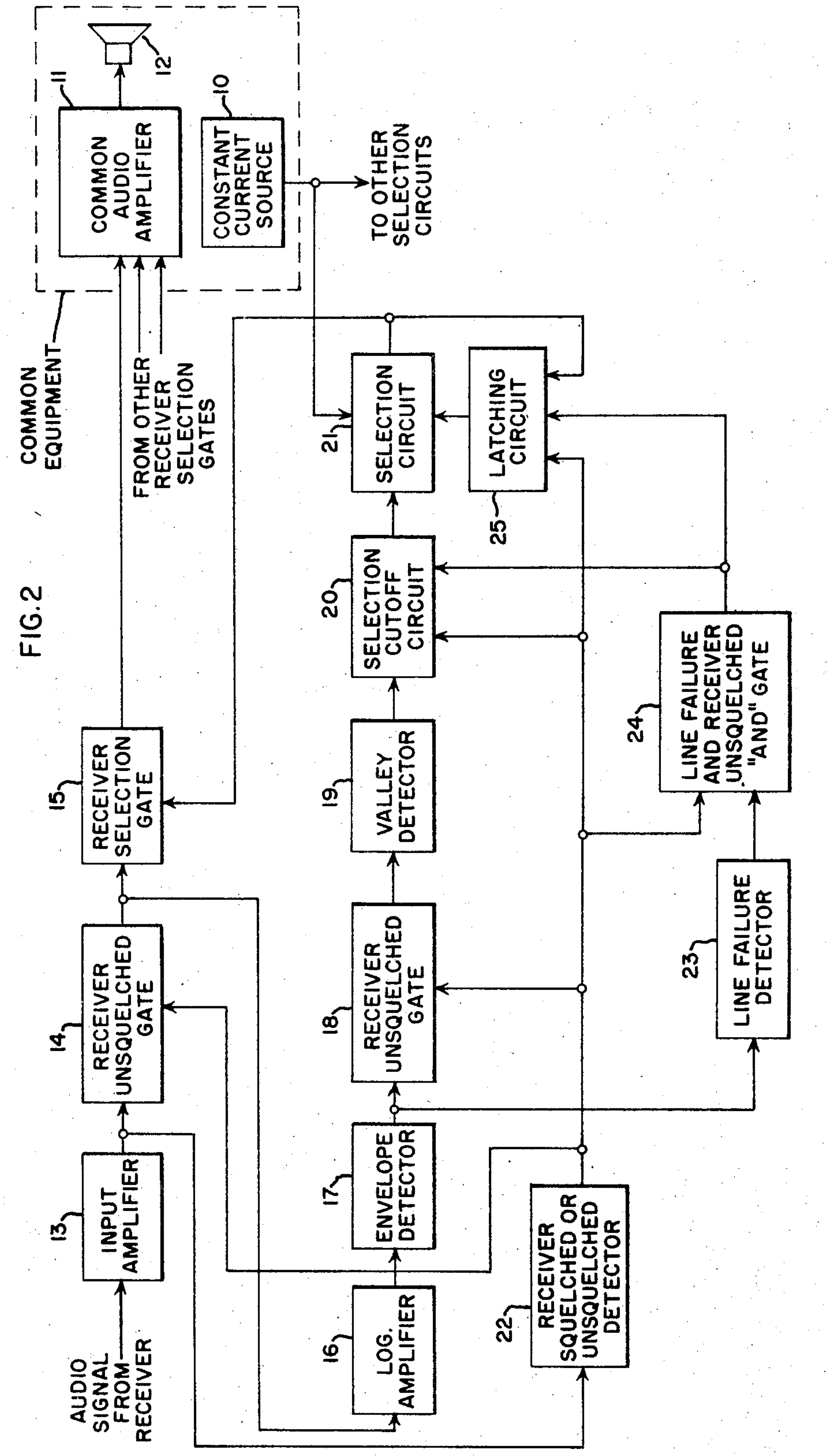
FIG. 2 shows a block diagram of a selecting arrangement having an audio signal quality indicating circuit in accordance with my invention.

A block diagram of one of the selecting arrangements of FIG. 1 is shown in FIG. 2. The common equipment, namely the amplifier 11, the loudspeaker 12, and the constant current source 10, are also shown in FIG. 2, so that the operation of my invention with the common equipment can be understood. The audio signals from the receiver are supplied over a line (not shown) to an input amplifier 13 which provides sufficient amplification and an impedance match. These audio signals are supplied to a receiver unsquelched gate 14 which permits the audio signals to be applied to a receiver selection gate 15 if the respective receiver is unsquelched, but which blocks the audio signals if the particular receiver is squelched. In accordance with my invention, I propose that each receiver supply a signal to indicate that it is squelched. I prefer that this signal to be an audio tone in the vicinity of 1950 Hertz, although other frequencies can be used. This tone can be provided by each receiver in any one of a number of known ways. Squelch circuits are well known in the art, and are commonly used in receivers. Generally, a squelch signal is provided by the receiver in the absence of a detectable carrier, and is used to inhibit noise in the receiver output. This same squelch signal can be utilized to cause the receiver to generate the squelch tone which can be supplied over the receiver line to the input amplifier 13. If the squelch signal is removed, as it would be when the receiver receives a usable signal, then the removal of the squelch signal can also be used to remove the squelch tone. The squelch tone is supplied from the output of the input amplifier 13 to a receiver squelched or unsquelched detector 22. If the tone is present, indicating that the receiver is squelched, the detector 22 provides a signal that causes the receiver unsquelched gate 14 to prevent passage of audio signals. If the tone is absent, indicating that the receiver is unsquelched, the detector 22 provides a signal that opens the receiver unsquelched gate 14 and permits the audio signals to be supplied to the receiver selection gate 15. However, the receiver selection gate 15 does not permit audio signals to pass to the audio amplifier 11 until a quality comparison has been made of all received signals from unsquelched receivers, and only the particular gate 15 associated with the best quality signal will permit the audio signal to pass to the amplifier 11.

Figures 3, 4:
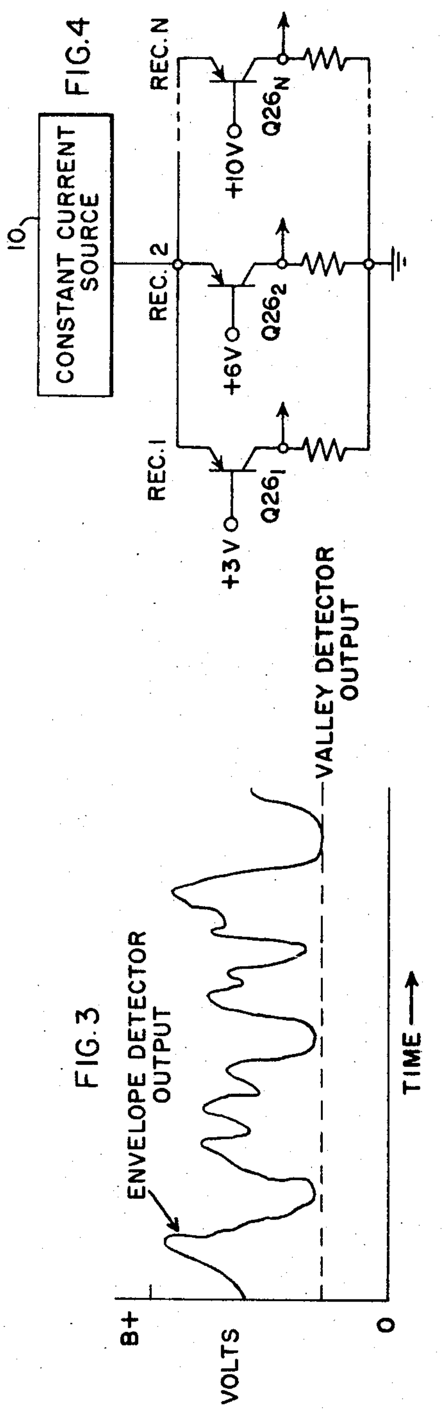
FIG. 3 shows a waveform illustrating the operation of my audio signal quality indicating circuit.
FIG. 4 shows a schematic diagram of a circuit that evaluates the signals produced by a plurality of my audio signal quality indicating circuits; and FIGS. *5a*, *5b*, and *5c* show a complete schematic diagram of my selecting arrangement of FIG. 2.

The audio signal quality indicating circuit of my invention is generally included in the six horizontal blocks 16 through 21 in FIG. 2. Signals from the receiver unsquelched gate 14 (passed only if the respective receiver is unsquelched) are connected to a logarithmic amplifier 16 which amplifies input signals in a manner that varies inversely and logarithmically with the input amplitude. In other words, as the input amplitude of applied signals increases, the gain of the amplifier decreases so that for larger inputs the relative increase in output is less than for smaller inputs. The output amplitude bears a logarithmic relationship to the input amplitude. Such a logarithmic amplifier is known in the art, and is provided so as to convert the input voltage amplitudes into a linear function of the amount of noise quieting provided by the respective receiver as measured in decibels (db). Since the decibel is a logarithmic function, the logarithmic amplifier is required. These amplified signals are applied to a positive envelope detector 17 which, as known in the art, provides a positive voltage envelope indicative of the variations of peak amplitude of the audio signals. This envelope signal is applied to a receiver unsquelched gate 18 that permits the envelope signal to pass if the detector 22 indicates that the respective receiver is unsquelched, but that blocks the envelope signal if the detector 22 indicates that the receiver is squelched. Envelope signals passed by the gate 18 are then applied to a valley detector 19 which detects the lowest amplitude (that is, the least positive voltage) that the envelope signals attain. The lowest amplitude attained is a measure of the background noise in the audio signal. And the amount of background noise is a measure of the quality of the received signals. The valley detector 19 has a relatively long time constant (in the order of five seconds) so that its output remains substantially constant between syllables of received speech signals. The envelope detector signals and the valley detector signals are shown in FIG. 3. In FIG. 3, it will be seen that as the valley detector signal becomes lower, this indicates that the background noise is lower, and hence the quality of the received audio signals is better. The valley detector output signal is applied to a selection cutoff circuit 20. The selection cutoff circuit 20 passes the valley detector output signal only if the receiver squelched or unsquelched detector 22 indicates an unsquelched condition, and only if a line failure and receiver unsquelched AND gate 24 provides the proper signal. The AND gate 24 receives a signal from a line failure detector 23 and the detector 22. The detectors 23, 22 must indicate that there is no line failure and that the associated receiver is unsquelched before the selection cutoff circuit 20 passes the valley detector output signal.

The signal passed by the selection cutoff circuit 20 is applied to a selection circuit 21 which is supplied with a constant current from the constant current source 10. FIG. 4 shows a more detailed diagram of three of the selection circuits 21, this diagram being related to FIG. 1 in that the same number of receivers 1 through N are contemplated. Each of the selection circuits 21 utilizes a PNP-type transistor Q26 (followed by a subscript indicating the particular receiver with which the selection circuit 21 is associated). These transistors have their emitters connected to the constant current source 10, which is a suitable direct current source that supplies a constant current, in a preferred embodiment this being 1 milliampere. The collectors of the transistors are connected through a resistor to the reference potential or ground for the source 10. Each base of the transistor is connected to its respective selection cutoff circuit 20. When the selection cutoff circuit 20 permits the valley detector signal to pass, each of the respective transistor bases is supplied with a valley detector output. In FIG. 4, I have shown the three bases being respectively applied with a +3 volt signal, a +6 volt signal, and a +10 volt signal. In connection with FIG. 3, it will be recalled that this valley detector voltage becomes lower as the audio signal quality improves. In this case, I have assumed that receiver 1 provides the best signal so that its valley detector 19 produces the lowest voltage (namely +3 volts). This lowest voltage causes the transistor $Q26_1$ to conduct more current then the other transistors $Q26_2$ and $Q29_{NO}$. Hence, the emitter of the transistor $Q26_1$ becomes approximately +3.5 volts, taking the emitter-to-base voltage drop into consideration. With the emitter of the transistor $Q26_1$ at approximately +3.5 volts, the other transistors $Q26_2$ and $Q26_N$ are back-biased so that they do not conduct. Hence, the collector of the transistor $Q26_1$ is positive, and this positive signal is applied to the respective receiver selection gate 15 to cause that gate, and that gate only, to open and pass audio signals from that receiver to the audio amplifier 11.

If, during reception, the audio signal from another receiver becomes better than the assumed case where the receiver 1 provided the best audio signal, then the quality indicating circuit of my invention will permit the audio signals from that receiver to be utilized in the audio amplifier 11. In this connection, I provide a latching circuit 25 so that when a selection is made, a subsequent change in selection will not be made until another audio signal becomes approximately 10 percent better than the audio signal selected. The latching circuit 25 does not latch its selection circuit 21 until the associated detector 22 provides an unsquelched signal, until the associated line failure and receiver unsquelched AND gate 24 supplies a signal, and until its associated selection circuit 21 indicates that a selection has been made.

As mentioned earlier, it is possible that a communication line connecting the receiver to the common location and selecting arrangement can, under some conditions, become open or short-circuited. Under such conditions, the line may become very quiet, and no squelch tone may be supplied, thus indicating that a signal is being received and that its quality is very good when, in fact, no signal at all is being received. The line failure detector 23 receives the positive envelope signals from the envelope detector 17, and if voltage peaks and valleys (indicating an audio signal) are present and have approximately 3 db difference between these peaks and valleys, a signal indicating presence of audio is supplied to the AND gate 24. The AND gate 24 also is supplied with signals from the receiver squelched or unsquelched detector 22. In order for the AND gate 24 to provide a signal that permits the selection cutoff circuit 20 to pass the valley detector output signals, a signal indicating that the receiver is unsquelched (that is, no tone), and a signal indicating presence of audio must be received. If the inputs to the AND gate 24 indicate that tone is received, or that no audio is present, then the AND gate 24 blocks the selection cutoff circuit 20. However, if the line is open or short-circuited so that no tone could be received (falsely indicating an unsquelched condition), then the absence of audio signals would cause the line failure detector 23 to indicate failure. The signal from the AND gate 24 is also applied to the latching circuit 25, and is required in order for the latching circuit 25 to latch the selection circuit 21.

From the general description given above, it will be seen that my invention provides a new and improved audio signal quality indicating circuit. My circuit overcomes many of the disadvantages of prior-art arrangements, in that it can make subsequent selections, is relatively fast, can utilize telephone lines that do not carry direct current, and can make a subsequent selection during and without interrupting transmission. In addition, my selecting arrangement can be utilized with almost any number of receivers.

DETAILED DESCRIPTION

Figure 5B:
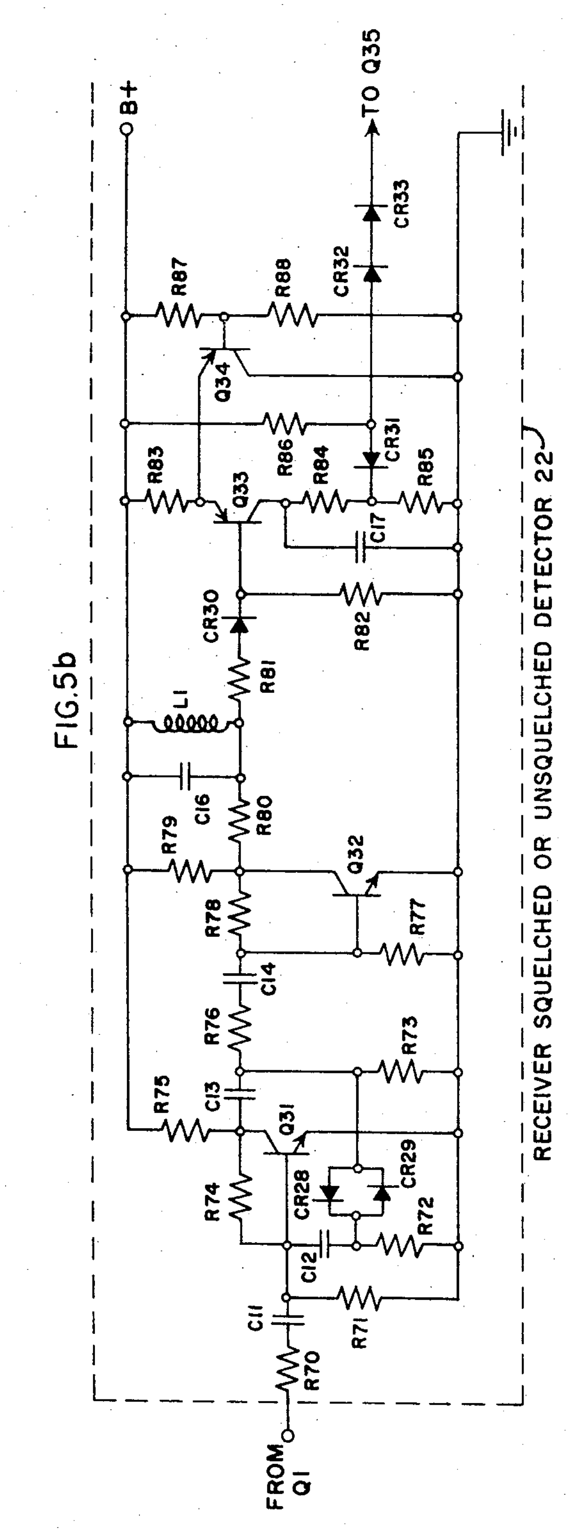
Figure 5A:
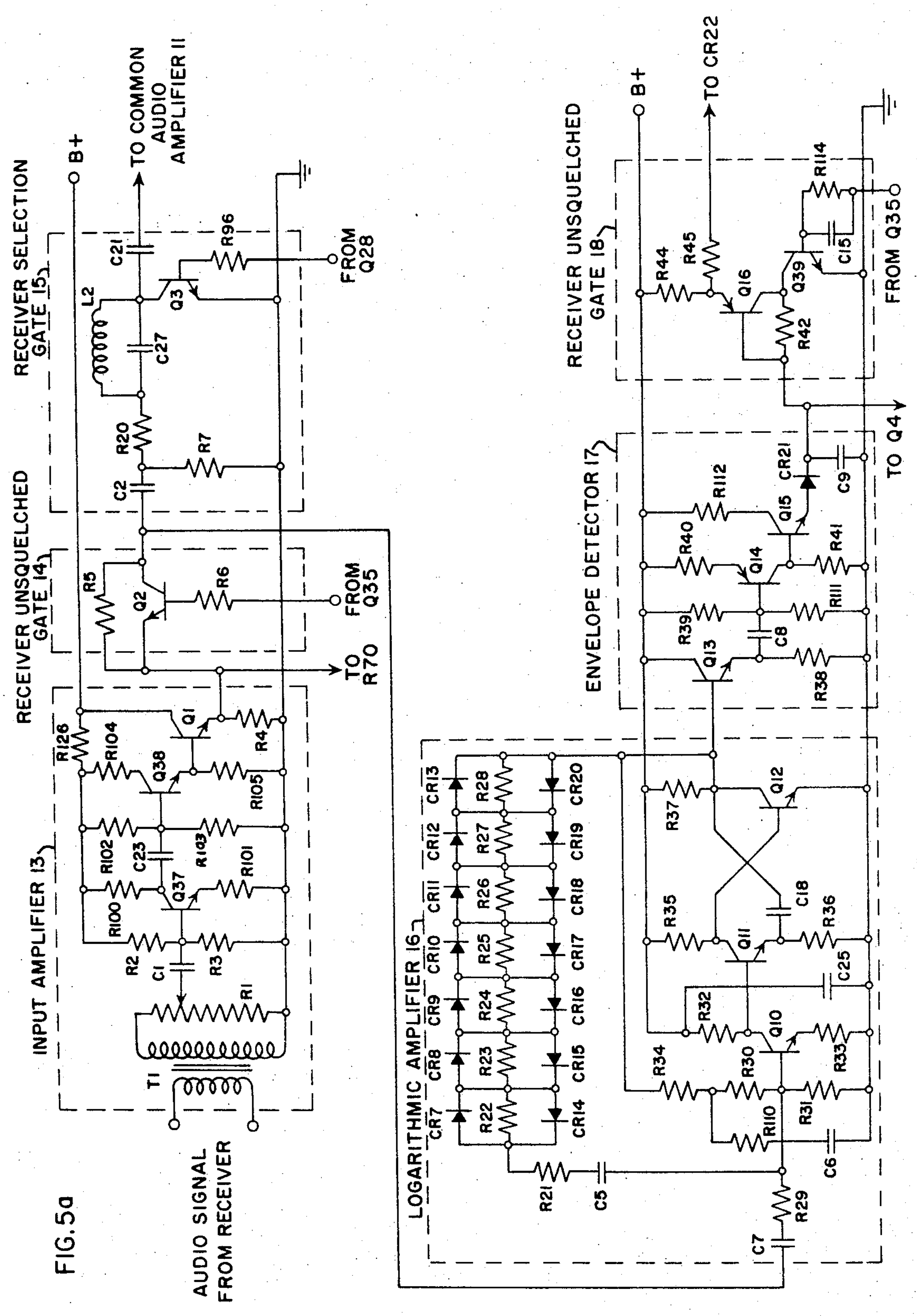
Figure 5C:
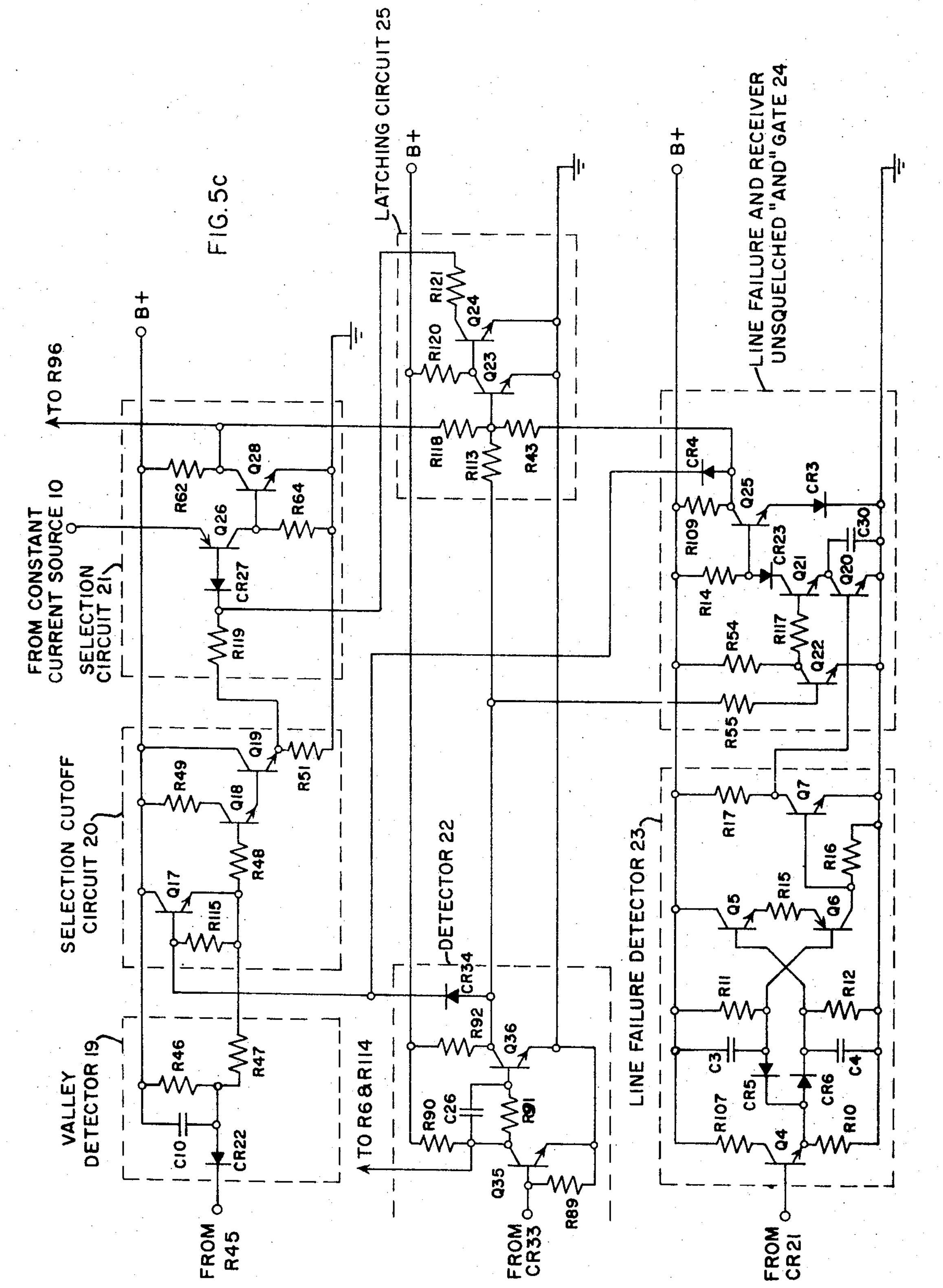

The circuit shown in block diagram form in FIG. 2 has been built and operated in a number of installations. The circuit was operated with a plurality of typical frequency-modulation (FM) receivers, each of which was provided with an oscillator to produce a 1,950 Hertz tone when the receiver was squelched. The tone was removed when the receiver was unsquelched, thus indicating reception of a signal transmission. Each receiver was provided with the indicating circuit in accordance with my invention. A detailed schematic diagram of the whole system is shown in FIGS. 5*a*, 5*b*, and 5*c*, the audio signal quality indicating circuit being in FIGS. 5*a* and 5*c*. In the consideration of these Figures, FIG. 5*a* should be positioned directly above FIG. 5*b*; FIG. 5*c* should be approximately centered to the right of FIGS. 5*a* and 5*b*; and the Figures connected as indicated. If the Figures are arranged in this manner, the various parts of the schematic diagram will be positioned in substantially the same location as the corresponding blocks in FIG. 2. The blocks of FIG. 2 have been indicated in FIGS. 5*a*, 5*b*, and 5*c* by appropriate dashed line rectangles bearing the same designations and reference numerals. The circuits shown in FIGS. 5*a*, 5*b*, and 5*c* are supplied with a suitable source of direct current between the indicated terminals B+ and ground.

My audio signal quality indicating circuit is shown in the horizontal blocks at the bottom of FIG. 5*a* and at the top of FIG. 5*c*. These blocks include the logarithmic amplifier 16, the envelope detector 17, the receiver unsquelched gate 18, the valley detector 19, the selection cutoff circuit 20, and the selection circuit 21. This signal quality indicating circuit measures the quality of the incoming audio signals, and compares all audio signals being provided by receivers in the system. The best quality signal, as determined by my circuit, is selected and applied to the audio amplifier 11 or other utilization device.

The logarithmic amplifier 16 comprises the three transistor Q10, Q11, A12, which are connected as an operational amplifier with a non-linear, negative feedback network including the diodes CR7 through CR20, and the resistors R21 through R28. This feedback network is non-linear, so that low amplitude signals are amplified more than high amplitude signals. When a receiver is unsquelched and tone is removed, the audio signals from the transistor Q2 in the gate 14 are supplied to the logarithmic amplifier 16 through the blocking capacitor C7 and an input resistor R29. These audio signals at the collector of the transistor Q12 are applied to the negative feedback network. The network is arranged so that each 0.6 volt of the audio signal causes one pair of diodes, beginning with the diodes CR13 and CR20, to conduct. This short-circuits one resistor, beginning with the resistor R28, and thus supplies a small increment of negative feedback. As the amplitude of voltage on the transistor Q12 increases more diodes are rendered conductive to short-circuit more resistors so that more negative feedback is provided. Each resistor value is one half the preceding resistor value so that the increments of feedback are not equal but logarithmically related. Thus, the gain decreases logarithmically with increases in signal level and the decibel value of the applied voltage is converted into a given linear voltage.

Signals from the logarithmic amplifier 16 are applied to the envelope detector 17. This detector 17 comprises two amplifier transistors Q13, Q14, a detector transistor Q15, a diode CR21, a capacitor C9, and a resistor R42 shown in the gate 18. The detector 17 provides a positive voltage which varies in accordance with the envelope of the applied audio signals as shown in FIG. 3. Because of the presence of background noise, this envelope output voltage only goes as low as the noise threshold level present between each syllable or sound in the audio. When the gate 18 is open, it permits the envelope signals to pass, in the absence of a tone as indicated by the table above, from the envelope detector 17 to the valley detector 19. A positive voltage indicating no tone renders the transistor Q39 conductive so that the transistor Q16 can pass the envelope detector signals. The valley detector 19 is an inverted peak detector circuit having a relatively long time constant (in the order of five seconds). The main elements of the valley detector 19 comprise the diode rectifier CR22 and the timing or time constant circuit capacitor C10 and the resistor R46. The lower excursions of the envelope detector output signal cause the transistor Q16 in the gate 18 to conduct. When the transistor Q16 conducts, the diode CR22 is forward-biased to cause the capacitor C10 to charge downward to the lowest voltage provided by the envelope detector output. This voltage is held between syllables or sounds by the relatively large value of the resistor R46 so that the capacitor C10 does not discharge appreciably during that interval. Thus, the output of the valley detector 19 is a direct current voltage that is proportional to the noise level between syllables, as shown by the dashed horizontal line in FIG. 3. This voltage can vary slowly as a function of audio signal quality and the detector time constant.

This direct current voltage is applied to the selection cutoff circuit 20. The cutoff circuit 20 permits signals to pass when the transistor Q17 is non-conductive. The transistor Q17 can override the signal quality indicating circuit by disabling the selection circuit 21. When the transistor Q17 conducts, as indicated by a squelched condition of the receiver, or as indicated by a line failure as will be explained, a relatively high positive voltage is applied by its emitter to the base of the transistor Q18. This condition indicates a relatively high valley detector output voltage. Hence, that receiver will not be selected and a selection will be made from some other receiver having a lower valley detector output voltage. The transistors Q18, Q19 supply the valley detector signal to the selection circuit 21. The transistors Q18, Q19 are high-impedance voltage-followers, so that very little of the direct current signal voltage from the valley detector 19 is lost across the resistors R47, R48.

In the selection circuit 21, a voltage-follower transistor Q26 receives this direct current signal. The transistor Q26 is supplied with a constant current source which, as explained in connection with FIG. 4, is connected to each of the signal quality indicating circuits in a system. The best signal, as indicated by the lowest valley detector output voltage, will cause its respective transistor Q26 to conduct more than the other transistors, and thereby back-bias the other transistors Q26. Conduction of the transistor Q26 provides sufficiently positive voltage at its collector to cause the associated transistor Q28 to be turned on. This causes the collector voltage of the transistor Q28 to approach zero. This zero voltage is applied through the resistor R96 (FIG. 5*a*) to the base of the transistor Q3 in the receiver selection gate 15. This causes the transistor Q3 to turn off so that audio signals can pass to the amplifier 11 for utilization.

It will thus be seen that my quality indicating circuit provides improved operation in a receiver selecting arrangement. While I have shown a particular selecting arrangement, my quality indicating circuit can be used with various other types of selecting arrangements besides receiver selecting. Such other selecting arrangements may require voltages of opposite polarity which can be provided by appropriate modification of my circuit. Or, they may not require the gate 18, which can be omitted by connecting the envelope detector 17 directly to the valley detector 18. Therefore, while my invention has been described with reference to a particular embodiment, it is to be understood that modifications may be made without departing from the spirit of the invention or from the scope of the claims.

What I claim as new and desire to secure by Letters Patent of the United States is:

1. In a system for selecting one of a plurality of radio receivers arranged to receive a transmitted radio signal and connected to supply audio signals to a common utilization device, an improved circuit for indicating the quality of the audio signals, said circuit comprising:

a. a logarithmic amplifier to which audio signals are applied;

b. a detector connected to said logarithmic amplifier for producing an envelope signal from said audio signals;

c. a circuit connected to said envelope detector for producing a unidirectional voltage having a magnitude proportional to the lowest voltage of said envelope signal and thus indicative of the quality of said audio signal;

d. and output means connected to said unidirectional voltage producing circuit for utilizing said unidirectional voltage in a comparison circuit.

2. The improved circuit of claim 1 wherein said unidirectional voltage producing circuit has a time constant sufficiently long to maintain said unidirectional voltage between normal conversational audio signals.

3. In a system having a plurality of radio receivers at spaced locations for receiving a common transmitted radio signal and producing an audio signal in response thereto, and having means for selecting one of said radio receivers to provide audio signals for utilization, an improved circuit adapted to be used with each of said radio receivers for providing a signal whose amplitude is a measure of the quality of the audio signals produced by its respective receiver, said improved circuit comprising:

a. an input for the audio signals from the respective receiver;
b. a logarithmic amplifier coupled to said input for converting said audio signals to signals that vary in a substantially linear manner in response to the noise quieting of said radio receiver;
c. an amplitude detector coupled to said logarithmic amplifier for producing an envelope voltage that varies as a function of the instantaneous peak voltages of said audio signals;
d. a valley detector coupled to said amplitude detector for producing a voltage indicative of the minimum values of said amplitude detector voltage with respect to a reference voltage; and
e. an output coupled to said valley detector for providing an output signal from said improved circuit for comparison with other output signals.

4. The improved circuit of claim 3, and further comprising a constant current source connected to said output circuit for comparing the valley detector output signal with other valley detector output signals.

* * * * *